United States Patent
Sierra Gonzalez et al.

(10) Patent No.: US 11,648,935 B2
(45) Date of Patent: May 16, 2023

(54) DRIVING ASSISTANCE METHOD AND SYSTEM (71) Applicants: TOYOTA MOTOR EUROPE, Brussels (BE); INSTITUT NATIONAL DE RECHERCHE EN INFORMATIQUE ET EN AUTOMATIQUE, Rocquencourt (FR); INSTITUT NATIONAL DES SCIENCES APPLIQUEES DE LYON, Villeurbanne (FR)

(72) Inventors: David Sierra Gonzalez, Gijon (ES); Christian Laugier, Montbonnot Saint-Martin (FR); Jilles Steeve Dibangoye, Villeurbanne (FR); Alejandro Dizan Vasquez Govea, Palo Alto, CA (US); Nicolas Vignard, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 169 days.

(21) Appl. No.: 16/345,987

(22) PCT Filed: Oct. 31, 2016

(86) PCT No.: PCT/IB2016/001737
§ 371 (c)(1),
(2) Date: Apr. 29, 2019

(87) PCT Pub. No.: WO2018/078413
PCT Pub. Date: May 3, 2018

(65) Prior Publication Data
US 2019/0329763 A1 Oct. 31, 2019

(51) Int. Cl.
*B60W 30/09* (2012.01)
*G06N 20/00* (2019.01)
(Continued)

(52) U.S. Cl.
CPC ........ *B60W 30/09* (2013.01); *B60W 30/0956* (2013.01); *B60W 40/04* (2013.01);
(Continued)

(58) Field of Classification Search
CPC .. B60W 30/09; B60W 30/0956; B60W 40/04; B60W 50/0097; B60W 50/14;
(Continued)

(56) References Cited

U.S. PATENT DOCUMENTS

2006/0041381 A1* 2/2006 Simon .................... G08G 1/161
340/436
2008/0084283 A1* 4/2008 Kalik ...................... B60Q 9/00
701/301
(Continued)

OTHER PUBLICATIONS

Pieter Abbeel, Apprenticeship Learning via Inverse Reinforcement Learning, 2004, Proceedings of the 21 st International Conference on Machine Learning (Year: 2004).*
(Continued)

*Primary Examiner* — Elaine Gort
*Assistant Examiner* — Matthias S Weisfeld
(74) *Attorney, Agent, or Firm* — Sughrue Mion, PLLC (57) ABSTRACT

A driving assistance system includes a sensor set, a data storage device and an output device. The sensor set detects a set of road users and, for each road user, a current state including a current speed and a current position. The data storage device includes a finite plurality of behavioral models. The data processor assigns a behavioral model to each road user, probabilistically estimates, for each road user, a belief state comprising a set of alternative subsequent states and corresponding probabilities, each alternative subsequent state including a speed and a position, according to the behavioral model assigned to each road user, and determines a risk of collision of the road vehicle with a road user, based on the probabilistically estimated future state of each road
(Continued)

user. The output device outputs a driver warning signal or executes an avoidance action if the risk of collision exceeds a predetermined threshold.

12 Claims, 4 Drawing Sheets

(51) Int. Cl.
| | | |
|---|---|---|
| B60W 40/04 | (2006.01) | |
| B60W 50/14 | (2020.01) | |
| G06V 20/58 | (2022.01) | |
| B60W 30/095 | (2012.01) | |
| B60W 50/00 | (2006.01) | |
| G08G 1/16 | (2006.01) | |
| G06V 20/56 | (2022.01) | |

(52) U.S. Cl.
CPC ........ *B60W 50/0097* (2013.01); *B60W 50/14* (2013.01); *G06N 20/00* (2019.01); *G06V 20/58* (2022.01); *G06V 20/588* (2022.01); *G08G 1/166* (2013.01); *B60W 2050/0028* (2013.01)

(58) Field of Classification Search
CPC ........ B60W 2050/0028; B60W 30/095; G06N 20/00; G06K 9/00798; G06K 9/00805; G08G 1/166
USPC .......................................................... 701/23
See application file for complete search history.

(56) References Cited

U.S. PATENT DOCUMENTS

| | | | | |
|---|---|---|---|---|
| 2008/0312830 A1* | 12/2008 | Liu | ........................ | G08G 1/166 340/436 |
| 2009/0112462 A1* | 4/2009 | Lo | ...................... | G01C 21/3632 701/533 |
| 2010/0106418 A1* | 4/2010 | Kindo | ..................... | G08G 1/167 701/300 |
| 2017/0329332 A1* | 11/2017 | Pilarski | ............... | B60W 30/095 |
| 2018/0077524 A1* | 3/2018 | Post | ........................ | H04L 67/52 |

OTHER PUBLICATIONS

Sergey Levine, Continuous Inverse Optimal Control with Locally Optimal Examples, 2012, Proceedings of the 29 the International Conference on Machine Learning (Year: 2012).*

Christopher,Tay, "Analysis of Dynamic Scenes: Application to Driving Assistance", Institut National Polytechnique de Grenoble, Sep. 4, 2009, pp. 13-182 (183 pages).

Laugier, Christian, et al., "Probalistic Analysis of Dynamic Scenes and Collision Risk Assessment to Improving Driving Safety", IEEE Intelligent Transportation Systems Magazine, 2011, vol. 3, No. 4, pp. 4-19 (17 pages).

Lawitzky, Andreas, et al., "Interactive Scene Prediction for Automotive Applications", 2013 IEEE Intelligent Vehicles Symposium, 6 pages.

Ziebart, Brian, et al., "Planning-based prediction for pedestrians" IEEE/RSJ, 2009, 8 pages.

Kitani, Kris, et al., "Activity Forecasting", Springer Berlin Heidelberg, 2012, pp. 1-14 (15 pages).

Vasquez, Dizan, "Novel Planning-based Algorithms for Human Motion Prediction", Proceedings of the IEEE Conference on Robotics and Automation, May 2016, 7 pages.

Schwarting, Wilko, et al., "Recursive Conflict Resolution for Cooperative Motion Planning in Dynamic Highway Traffic", 2014 IEEE 17th International Conference on Intelligent Transportation Systems, 2014, pp. 1039-1044.

Gindele, Tobias, et al. "Learning Driver Behavior Models from Traffic Observations for Decision Making and Planning", IEEE Intelligent Transportation Systems Magazine, vol. 7, No. 1, 2015, pp. 69-79.

Lee, Namhoon, et al., "Predicting Wide Receiver Trajectories in American Football", 2016 IEEE Winter Conference on Applications of Computer Vision, 9 pages.

Petrovskaya, Anna, et al., "Awareness of Road Scene Participants for Autonomous Driving", vol. 2, 2011, pp. 1-37.

Abbeel, Pieter, et al., "Apprenticeship Learning via Inverse Reinforcement Learning", Proceedings of the Twenty-First International Conference on Machine Learning, 2004, 8 pages.

Levine, Sergey, et al., "Continuous Inverse Optimal Control with Locally Optimal Examples" Proceedings of the $29^{th}$ International Conference on Machine Learning, 2012, 8 pages.

Ziebart, Brian, et al., "Maximum Entropy Inverse Reinforcement Learning", Proceedings of the Twenty-Third AAAI Conference on Artificial Intelligence, AAAI 2008, 6 pages.

International Search Report for PCT/IB2016/001737 dated Jul. 7, 2017 [PCT/ISA/210].

* cited by examiner

DRIVING ASSISTANCE METHOD AND SYSTEM

CROSS REFERENCE TO RELATED APPLICATIONS

This application is a National Stage of International Application No. PCT/IB2016/001737 filed Oct. 31, 2016.

TECHNICAL FIELD

The disclosure relates to a driving assistance model and system for road vehicles, as well as to a road vehicle comprising such a driving assistance system. In this context, "driving assistance" should be understood broadly and not be limited to the support of an active human driver, but extend even to fully autonomous driving.

BACKGROUND

Recent years have seen a significant increase in research on Advanced Driver Assistance Systems (ADAS). Especially, autonomous driving has become a critical concern around the world, whether it is to increase safety and security of drivers, passengers or pedestrians, enhance mobility for people and freight, or protect the environment. However, techniques to accurately predict the trajectories and intents of road users are time and memory demanding, which sets an obstacle to the development of safe and secure autonomous driving systems.

C. Tay, in the PhD thesis "Analysis of dynamic scenes: application to driving assistance", Institut National Polytechnique de Grenoble, France, and C. Laugier, I. Paromtchik, M. Perrollaz, M. Yong, J. D. Yoder, C. Tay, K. Mekhnacha and A. Nègre, in "Probabilistic analysis of dynamic scenes and collision risks assessment to improve driving safety", IEEE Intelligent Transportation Systems Magazine, 3(4):4-19, have disclosed a traffic scene prediction method in which a set of available maneuvers is considered for each road user in a traffic scene, the maneuver that a road user is performing or about to perform is identified using a layered Hidden Markov Model and, once identified, the trajectory that the road user will subsequently follow is predicted using Gaussian processes based on previously recorded data of drivers performing the same maneuver. However, the prediction time horizon of this method is limited to the duration of the maneuver, and no interaction between road users is considered.

A. Lawitzky, D. Althoff, C. F. Passenberg, G. Tanzmeister, D. Wollherr and M. Buss, in "Interactive scene prediction for automotive applications", 2013 IEEE Intelligent Vehicles Symposium (IV), Gold Coast City, Australia, Jun. 23-26, 2013, pp. 1028-1033, disclosed a scene prediction method that relied on exhaustively estimating the intent of all road users. Such a method, however, has a computational complexity which increases exponentially with the number of vehicles in the traffic scene, and can thus be excessive for the limited computational resources available on an onboard vehicle.

Instead, planning-based approaches have been proposed which assume that pedestrians, in their motion, seek to minimize a cost function which depends on their preferences and the context. Thus, given the cost function and the context, their future actions can be predicted. Such methods have been disclosed, for instance, by B. D. Ziebart, N. Ratliff, G. Gallagher, C. Mertz, K. Peterson, J. A. Bagnell, M. Hebert, A. K. Dey and S. Srinivasa, in "Planning-based prediction for pedestrians", Proceedings of the 2009 IEEE/RSJ International Conference on Intelligent Robots and Systems, ser. IROS'09, Piscataway, N. J., USA, 2009, pp. 3931-3936, by K. M. Kitani, B. D. Ziebart, J. A. Bagnell and M. Hebert, in "Activity Forecasting", Springer Berlin Heidelberg, 2012, pp. 201-214, and by D. Vasquez, in "Novel planning-based Algorithms for Human Motion Prediction", Proceedings of the IEEE Conference on Robotics and Automation, Stockholm, Sweden, May 2016.

These disclosures, however, focus on the problem of pedestrian motion prediction and their proposed approaches appear unsuitable for the wider ranges of behavior which a road vehicle may encounter in a traffic scene on a road. Moreover, a road is a dynamic environment in which the actions of each road user are strongly conditioned by the states of other, surrounding road users. The computational complexity of traffic scene predictions can be therefore much higher, as these predictions will involve predicting the actions of all road users while taking into account the interactions between them.

In this respect, W. Schwarting and P. Pascheka, in "Recursive conflict resolution for cooperative motion planning in dynamic highway traffic", 2014 IEEE $17^{th}$ International Conference on Intelligent Transportation Systems (ITSC), October 2014, pp. 1039-1044, have proposed a more refined approach which seeks the best cooperative behavior between two road users using hand-tuned cost functions in case of potential conflict between their trajectories as initially predicted without considering any interaction. Such cooperative behavior, however, does not accurately correspond to the natural behavior of road users, which is risk-averse rather than cooperative, given the limited scope for communication between them.

An alternative approach has been proposed by T. Gindele, S. Brechtel and R. Dillmann in "Learning driver behavior models from traffic observations for decision making and planning", IEEE Intelligent Transportation Systems Magazine, vol. 7, no. 1, pp. 69-79, 2015, in which each road user in a traffic scene is represented within a Dynamic Bayesian Network by a set of nodes representing its internal states and the relationships with the other road users and the road. Underlying policies are learned from data using random forests. However, it is not obvious how such a policy model can guarantee reasonable predictions when presented with new traffic scenes not included in a training set.

Finally, N. Lee and K. M. Kitani, in "Predicting wide receiver trajectories in American football", in 2016 IEEE Winter Conference on Applications of Computer Vision (WACV), March 2016, pp. 1-9, have proposed a planning-based approach in the completely different field of predicting trajectories of an attacking player in American football. This approach used a dynamic feature dependent on the motion of opposing players, which was predicted using supervised learning.

SUMMARY

A first object of the disclosure is that of proposing a driving assistance method which substantially increases the safety and security of a road vehicle by accurately predicting a future traffic scene, and taking appropriate action in response, using limited computational resources.

Accordingly, in at least one illustrative embodiment of a driving assistance method according to the present invention, the driving assistance method comprises the steps of detecting, within a traffic scene including the road vehicle, a set of road users and, for each road user of the set of road users, a current state including a current speed and a current position; assigning a behavioral model, from among a finite plurality of behavioral models, to each road user of the set of road users; probabilistically estimating by a data processor, for each road user of the set of road users, a belief state comprising a set of alternative subsequent states and corresponding probabilities, each alternative subsequent state including a speed and a position, using the behavioral model assigned to each road user of the set of road users; determining a risk of collision of the road vehicle with a road user of the set of road users, based on the probabilistically estimated belief state of each road user of the set of road users; and outputting a driver warning signal and/or executing an avoidance action if the risk of collision exceeds a predetermined threshold.

By selecting and assigning to each road user a behavioral model, which may in particular be expressed as a cost function encoding a set of preferences and/or a risk-averse behavior of the road user, from among a finite plurality of behavioral models, and probabilistically estimating the belief state of each road user using the corresponding behavioral model, the present driving assistance method can offer a high accuracy in scene prediction even with limited computational resources.

In order to offer a future traffic scene prediction that takes into account the uncertainty in the future behavior of road users, the belief state may be probabilistically estimated for each road user of the set of road users by the data processor performing the steps of estimating a probability of each action from a set of alternative subsequent actions for each road user of the set of road users, using the behavioral model assigned to each road user of the set of road users; calculating each alternative subsequent state resulting from each action of the set of alternative subsequent actions for the corresponding road user.

The finite plurality of behavioral models may comprise a dynamic behavioral model with at least one dynamic feature for taking into account a state of a road user other than the road user to which the dynamic behavioral model is assigned. Using such a dynamic behavioral model, it is possible to take into account the interactions between road users and their natural risk-averse behavior which anticipates the actions of other road users and leads them to act accordingly in order to minimize the risk of collision.

If the finite plurality of behavioral models comprises such a dynamic behavioral model, the step of estimating the probability of each action from the set of alternative subsequent actions for each road user of the set of road users may be carried out using a dynamic behavioral model taking into account at least a previously calculated occupancy probability distribution of the set of road users, so as to better fit the predictive behavior of human drivers.

In order to provide a long-term scene prediction, the belief state may be probabilistically estimated for each road user of the set of road users by the data processor for a plurality of successive timesteps, a new occupancy probability distribution being calculated on the basis of the belief state probabilistically estimated for each successive timestep.

To better take into account the interactions between road users, the driving assistance method may further comprise a step of sorting the set of road users by order of decreasing driving priority, before the step of estimating a probability of each action from a set of alternative subsequent actions, which may then be successively carried out for each road user of the set of road users following the order of decreasing driving priority.

The at least one dynamic feature may comprise a time-headway and/or a time-to-collision between the road user to which the dynamic behavioral model is assigned and another road user.

The dynamic behavioral model may be a dynamic behavioral model learned from observed road user behavior using a machine learning algorithm such as, for example, an inverse reinforcement learning algorithm, and in particular a maximum entropy inverse reinforcement learning algorithm.

Each behavioral model of the finite plurality of behavioral models may be associated with a cost function for calculating a cost of a subsequent action from a current state, and the probability of an action from a set of alternative subsequent actions for a given road user may then be estimated as one minus the ratio of a cost of the action to the sum total of costs of the set of alternative subsequent actions, according to the cost function associated with a behavioral model assigned to the given road user.

The traffic scene may comprise a multi-lane road, and the set of alternative subsequent actions for each road user of the set of road users may then comprise lane and/or speed changes.

The step of assigning a behavioral model, from among a finite plurality of behavioral models, to each road user of the set of road users may be carried out, by a data processor, based on behavior by each road user of said set of road users prior to the current states.

To assign to a road user a behavioral model from among the finite plurality of behavioral models, an aggregated probability of a prior trajectory of the road user, including successive prior states of the road user, may be calculated using each behavioral model, and the behavioral model with the highest aggregated probability may then be selected.

The present disclosure also relates to a driving assistance system for a road vehicle. According to at least one embodiment, the driving assistance system may comprise a sensor set, a data storage device, a data processor, and an output device. The sensor set may be adapted to detect, within a traffic scene including the road vehicle, a set of road users and, for each road user of said set of road users, a current state including a current speed and a current position. The data storage device may contain a database comprising a finite plurality of behavioral models. The data processor may be connected to the sensor set and to the data storage device, and adapted to assign a behavioral model, from among the finite plurality of behavioral models, to each road user of the set of road users, probabilistically estimate, for each road user of the set of road users, a future state including a future speed and a future position, according to the behavioral model assigned to each road user of the set of road users, and determine a risk of collision of the road vehicle with a road user of said set of road users, based on the probabilistically estimated future state of each road user of the set of road users. The output device may be connected to the data processor, and adapted to output a driver warning signal and/or executing an avoidance action if the risk of collision exceeds a predetermined threshold.

The present disclosure also relates to road vehicle comprising such a driving assistance system.

The above summary of some example embodiments is not intended to describe each disclosed embodiment or every implementation of the invention. In particular, selected features of any illustrative embodiment within this specification may be incorporated into an additional embodiment unless clearly stated to the contrary.

BRIEF DESCRIPTION OF THE DRAWINGS

The invention may be more completely understood in consideration of the following detailed description of an embodiment in connection with the accompanying drawings, in which.

While the invention is amenable to various modifications and alternative forms, specifics thereof have been shown by way of example in the drawings and will be described in detail. It should be understood, however, that the intention is not to limit aspects of the invention to the particular embodiment described. On the contrary, the intention is to cover all modifications, equivalents, and alternatives falling within the scope of the invention.

DETAILED DESCRIPTION

For the following defined terms, these definitions shall be applied, unless a different definition is given in the claims or elsewhere in this specification.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

Figure 1:
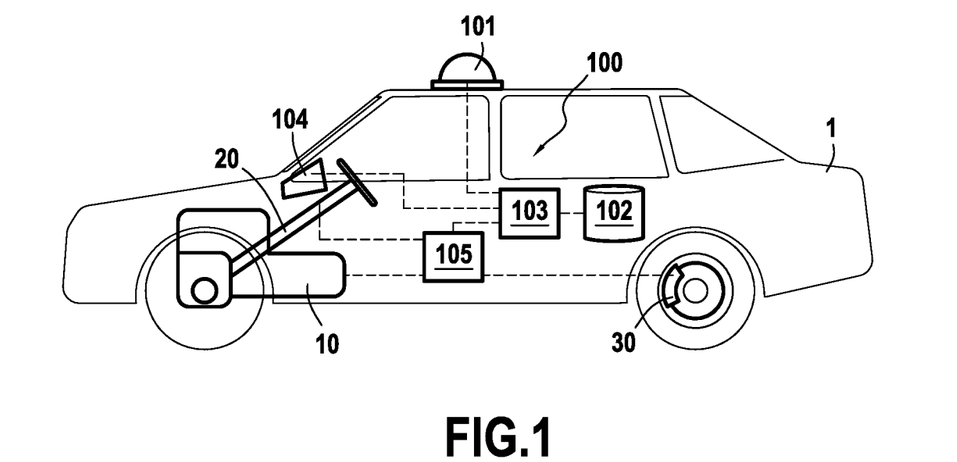
FIG. 1 is a schematic view of a road vehicle equipped with a driving assistance system according to an embodiment of the present invention.

FIG. 1 illustrates schematically a road vehicle 1 with a drivetrain 10, brakes 30, steering 20 and a driving assistance system 100 according to an embodiment of the invention. This driving assistance system 100 comprises a sensor set 101, a data storage device 102, a data processor 103, a warning signal output device 104 and a driving command output device 105. The data processor 103 is connected to the sensor set 101, to the data storage device 102, and to the warning signal and driving command output devices 104, 105. The driving command output device 105 is in turn connected to the drivetrain 10, brakes 30 and steering 20 of the road vehicle 1.

Figure 2:
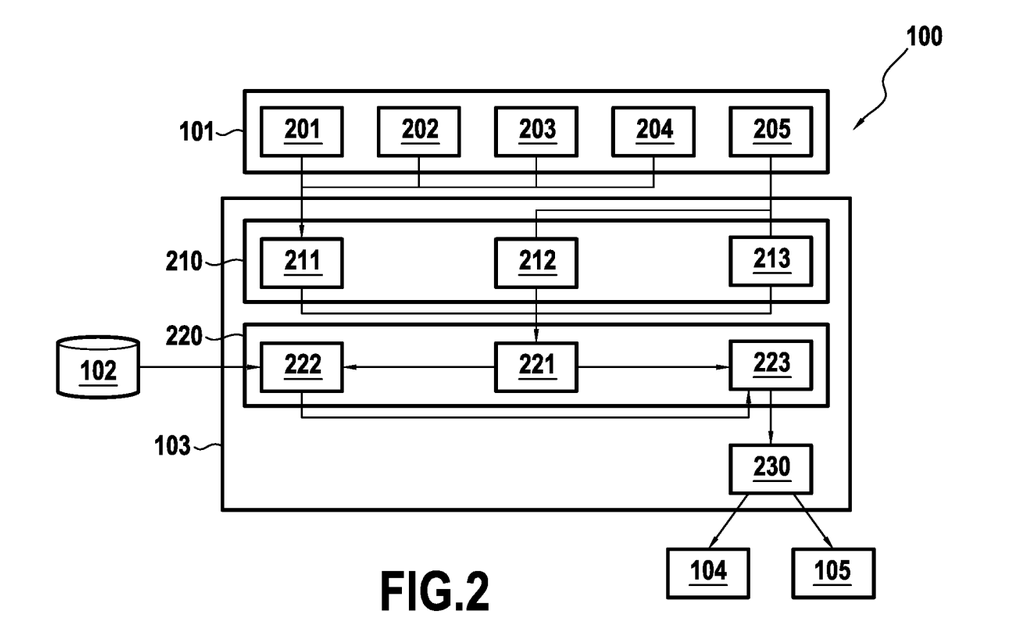
FIG. 2 is a functional diagram of the driving assistance system of FIG. 1.

FIG. 2 is a functional scheme of the driving assistance system 100. As illustrated in this figure, the sensor set 101 may comprise a variety of sensors, such as an inertial measurement unit 201, a satellite navigation receiver 202, a LIDAR 203, a radar 204, and a front camera 205. In the illustrated embodiment, the data processor 103 is adapted to process the raw incoming data from the sensor set 101 to identify and track obstacles, as well as to identify and track road lanes, and localize the road vehicle 1 on those road lanes and within a road network. This is illustrated in FIG. 2 by a first functional processing layer 210 in the data processor 103, including an obstacle tracker module 211, a lane tracker module 212 and a localization module 213.

The obstacle tracker module 211 processes the incoming data from the inertial measurement unit 201, satellite navigation receiver 202, LIDAR 203 and radar 204 in order to identify and track obstacles, in particular mobile obstacles such as other road users in a traffic scene within an area at least longitudinally centered on the road vehicle 1. This can be performed, for instance, using any one of the alternative algorithms disclosed by Anna Petrovskaya, Mathias Perrollaz, Luciano Oliveira, Luciano Spinello, Rudolph Triebel, Alexandros Makris, John-David Yoder, Christian Laugier, Urbano Nunes and Pierre Bessière in "Awareness of Road Scene Participants for Autonomous Driving" in Chapter "Fully Autonomous Driving" of "Handbook of Intelligent Vehicles", Vol. 2, Springer-Verlag London Ltd, 2012, edited by Azim Eskandarian.

On a multi-lane road within a road network, the lane tracker module 212 processes the incoming data from the front camera 205 in order to identify and track the lanes of the multi-lane road, whereas the localization module 213 processes the same incoming data to localize the road vehicle 1 on one of those lanes and in the road network.

The data processor 103 is also adapted to further process the output data from the first functional processing layer in order to predict a future traffic scene in the area centered on the road vehicle 1. This is illustrated on FIG. 2 by a prediction layer 220 in the data processor 103, including an observation management module 221, a behavioral model assignment module 222, and a scene prediction module 223.

The observation management module 221 merges the output from the obstacle tracker module 211, lane tracker module 212 and localization module 213 so as to generate a grid G covering the road in an area centered on the road vehicle 1 at least in a direction of travel, which may be a longitudinal direction of the road, and locate the other road users in the current traffic scene on this grid G, which is divided in cells (x, y), wherein x is a longitudinal cell index corresponding to a longitudinal position on the road, and y is a lane index. The longitudinal resolution of the grid can be denoted by $r_x$. The observation management module 221 allocates an index i to each road user of a finite set V of m road users, including road vehicle 1, within the area centered on road vehicle 1, and identifies its current position $(x^i, y^i)$ on this grid G, as well as its current speed $z^i$. The observation management module 221 also identifies as the current preferred speed $z^i_*$ of each road user i the maximum speed observed for that road user i since the last change in the legal speed limit on the road. Together, a tuple $((x^i, y^i), z^i, z^i_*)$ of position $(x^i, y^i)$, speed $z^i$ and preferred speed $z^i_*$ represent a state $s^i$ of each road user i.

The behavioral model assignment module 222 assigns a behavioral model, selected from a finite plurality of behavioral models in a database stored in the data storage device 102, to each road user i: These behavioral models may be defined by cost functions, and more specifically by dynamic cost functions $C^i_t(s^i)$ with a static part $C^i_s(s^i)=\theta^i_s \cdot f_s(s^i)$ and a dynamic part $C^i_{d,t}(s^i)=\theta^i_d \cdot f_{d,t}(s^i)$, following the equation:

$$C^i_t(s^i)=\theta^i_s \cdot f_s(s^i)+\theta^i_d \cdot f_{d,t}(s^i)$$

wherein $f_s(s^i)$ is a time-invariant vector of static features of state $s^i$, $f_{d,t}(s^i)$ is a vector of dynamic features of state $s^i$ at timestep t, wherein timestep t can take the values {0, 1, . . . , T−1} within a time horizon T, and $\theta_s^i$ and $\theta_d^i$ are weight vectors to be respectively applied to the static and dynamic features in order to establish the cost of those features for a given type of driving behaviour.

The static features may notably comprise a lane preference, and a speed deviation. For a multi-lane road with $n_l$ lanes, the lane preference may be expressed as a vector of $n_l$ mutually exclusive binary features, whereas the speed deviation corresponds to a difference between speed $z^i$ and preferred speed $z_*^i$.

The dynamic features of a road user i may notably comprise a time-headway $\phi(s^i, s^j)$ from a closest leading road user j on the same lane, a time-headway $\phi(s^i, s^k)$ to a closest trailing road user k on the same lane, a time-to-collision $\varphi(s^i, s^j)$ with the closest leading road user j on the same lane and a time-to-collision $\varphi(s^i, s^k)$ with the closest trailing road user k on the same lane.

The time-headway $\phi(s^i, s^j)$ from a leading road user j can be defined as a time elapsed between the back of the leading road user j passing a point, and the front of road user i reaching the same point, and may be calculated according to the equation:

$$\phi(s^i, s^j) = \frac{(x^j - x^i)r_x}{z^i}$$

The time-headway $\phi(s^i, s^k)$ to a trailing road user k can be defined as a time elapsed between the back of road user i passing a point, and the front of the trailing road user k reaching the same point, and may be calculated according to the equation:

$$\phi(s^i, s^k) = \frac{(x^i - x^k)r_x}{z^k}$$

The time-to-collision $\varphi(s^i, s^j)$ with a slower leading road user j can be defined as a time to elapse until the front of road user i hits the back of the leading road user j at their current speeds, and may be calculated according to the equation:

$$\varphi(s^i, s^j) = \frac{(x^j - x^i)r_x}{z^i - z^j}$$

The time-to-collision $\varphi(s^i, s^k)$ with a faster trailing road user k can be defined as a time to elapse until the front of the trailing road user k hits the back of road user i at their current speeds, and may be calculated according to the equation:

$$\varphi(s^i, s^j) = \frac{(x^i - x^k)r_x}{z^k - z^i}$$

Small time-headway and/or time-to-collision values may indicate dangerous situations.

The behavioral model database stored in the data storage device 102 in the present embodiment comprises a finite plurality of alternative dynamic behavioral models, each comprising a set of weight vectors $\theta_s^i$ and $\theta_d^i$ corresponding to a specific driving behavior. So, for instance, the database may contain a safe driver model, corresponding to a road user with a preference for high time-headway and/or time-to-collision values; an aggressive driver model, corresponding to a road user with a high tolerance for low time-headway and/or time-to-collision values and a preference for the left-most lane in a multi-lane road; an exiting driver model, corresponding to a road user aiming to take an oncoming exit from the multi-lane road, and therefore giving preference to merging into the right-most lane over maintaining its preferred speed; and an incoming driver model, corresponding to a road user adapting its speed in order to merge into the road lanes.

Each dynamic behavioral model may have previously been learnt offline from observed road behavior, for example using a machine learning algorithm such as an Inverse Reinforcement Learning (IRL) algorithm. IRL algorithms aim to find a cost function corresponding to a behavioral model underlying a set of observed trajectories, wherein each trajectory may be defined as a sequence of states over a plurality of consecutive timesteps. The goal of an IRL algorithm is to find the weight vectors of the cost function for which the optimal policy obtained by solving the underlying planning problem would result in trajectories sufficiently similar to the observed trajectories according to a given statistic. IRL algorithms have already been shown as a viable approach for learning cost functions describing driving behaviors, for example by P. Abbeel and A. Y. Ng, in "Apprenticeship learning via inverse reinforcement learning", Proceedings of the Twenty-first International Conference on Machine Learning (ICML 2004), Banff, Alberta, Canada, Jul. 4-8, 2004, and by S. Levine and V. Koltun, in "Continuous Inverse Optimal Control with Locally Optimal Examples", Proceedings of the 29th International Conference on Machine Learning (ICML '12), 2012.

An IRL algorithm that may in particular be used to learn the static and dynamic weight vectors $\theta_s^i$ and $\theta_d^i$ corresponding to a specific driving behavior is the Maximum Entropy Inverse Reinforcement Learning (ME IRL) algorithm disclosed by Brian D. Ziebart, Andrew Maas, J. Andrew Bagnell and Anind K. Dey in "Maximum Entropy Inverse Reinforcement Learning", Proceedings of the Twenty-Third AAAI Conference on Artificial Intelligence, AAAI 2008, Chicago, Ill., USA Jul. 13-17, 2008, pp. 1433-1438. A vehicle with sensors and a data processor may be driven naturally over roads, to observe and record trajectories of road users, from which the behavioral models may be learnt.

The cost function associated with a behavioral model can be used to calculate a probability $\pi_t^i(a^i|s^i)$ of a given road user i taking an action $a^i$ which will cause a transition $Tr^i(s^i, a^i)$ of the road user i from one state $s^i$ to another state $s^{i\prime}$ at time t. This probability may be calculated as one minus the ratio of the cost of state $s^{i\prime}$ at time t according to the cost function to the sum total of the costs of states that can be reached, from state $s^i$, through each and every action available to the road user i from state $s^i$ at time t. For a dynamic cost function $C_t^i(s^i)$, this can be expressed according to the equation:

$$\pi_t^i(a^i | s^i) \approx 1 - \frac{C_t^i(Tr^i(s^i, a^i))}{\sum_{a'^i \in A^i} C_t^i(Tr^i(s^i, a'^i))}$$

wherein $A^i$ is the set of all actions $a^i$ available to the road user i from state $s^i$ at time t.

In the behavioral model assignment module 222, a behavioral model is selected from among the finite plurality of alternative behavioral models in the database stored in the data storage device 102, to be assigned to a given road user i in a current traffic scene, on the basis of a prior trajectory of the road user i. This prior trajectory comprises the successive states of this road user i perceived through the observation management module 221 over a plurality of timesteps, eventually up to the current state $s^{i}$. In order to select the behavioral model which best matches the prior trajectory of the road user i from among the finite plurality of alternative behavioral models in the database, the aggregated probability of this prior trajectory according to each behavioral model is calculated using the cost function associated to that behavioral model, and the behavioral model with the highest aggregated probability is selected. More specifically, to calculate the aggregated probability of a prior trajectory according to a behavioral model, the probability of each action throughout the prior trajectory is calculated using the cost function associated with that behavioral model, and multiplied by each other.

The scene prediction module 223 predicts the future evolution of the current traffic scene, as perceived through the observation management module 221, using the behavioral models assigned by the behavioral model assignment module 222 to the road users within that current traffic scene. In particular, the scene prediction module 223 may predict this future evolution throughout a plurality of timesteps from the current traffic scene at a time t=0 to a time t=T, according to the prediction algorithm illustrated on FIG. 3.

Figure 3:
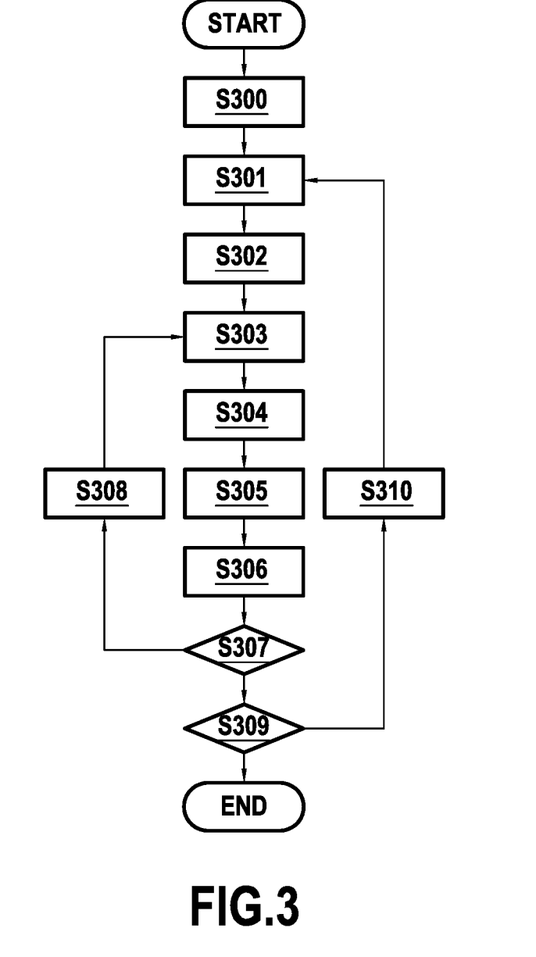
FIG. 3 is a flowchart illustrating an algorithm executed within a driving assistance method according to an embodiment of the present invention.

In a first step S300 in this algorithm, time index t is set to 0, and a belief state $b^{i}_{t}$, which is a probability distribution over the state space of each road user i at time t is initialized for t=0 by setting, as the initial belief state $b^{i}_{0}$ for each road user i of the m road users in the traffic scene, a probability of 1 for the current state $s^{i}$ of road user i, as perceived through the observation management module 221. To this initial belief state $b^{i}_{0}$ corresponds also an initial occupancy probability distribution $o^{i}_{0}(x^{i},y^{i})$ wherein an occupancy probability of 1 is set at the current position $(x^{i}, y^{i})$ of road user i, as perceived through the observation management module 221. After this initialization step S300, the m road users in the traffic scene are sorted by descending driving priority in the next step S301. This driving priority may be mainly allocated according to the longitudinal position of the road users, with a leading road user being allocated a higher driving priority than a trailing road user. However, the general and/or local rules of the road may also be taken into account in this driving priority allocation.

After executing step S301, road user index i is set to 1 in step S302. Then, in step S303, for each available action $a^{i}$ from each possible state $s^{i}$ of road user i at time t, the value of the dynamic cost component associated to each dynamic feature for each possible location $(x^{j}, y^{j})$ of each other road user j at time t is calculated by multiplying the value of that dynamic feature by the corresponding component of dynamic weight vector $\theta_{d}^{i}$ according to the behavioral model assigned to road user i and probability-weighted according to the occupancy probability distribution $o_{t}^{j}(x^{j},y^{j})$ of road users j. By "each possible state $s^{i}$", we understand in particular each state $s^{i}$ with a non-zero probability. In the calculation of dynamic features, such as time-headway and time-to-collision, of road user i with respect to a road user j at a location $(x^{j}, y^{j})$, a probability-weighted average of speeds $z^{j}$ of the possible states $s^{j}$ in which road user j occupies that location $(x^{j}, y^{j})$ may be used as the speed of road user j.

From the resulting set of values for the probability-weighted dynamic cost components, the highest value for each dynamic cost component is then selected to form a probability-weighted dynamic cost vector used in step S304 to calculate the probability $\pi_{t}^{i}(a^{i}|s^{i})$ of each available action $a^{i}$ from each possible state $s^{i}$ for road user i at time t.

In the next step S305, the belief state $b^{i}_{t+1}$ for road user i at the next timestep t+1 is calculated based on the probability $\pi_{t}^{i}(a^{i}|s^{i})$ and transition $Tr^{i}(s^{i}, a^{i})$ associated to each available action $a^{i}$ from each possible state $s^{i}$ for road user i at time t, according to the equation:

$$b^{i}_{t+1}(s'^{i}) = \sum_{s^{i}} \sum_{a^{i}} P(s'^{i} | s^{i}, a^{i}) \pi_{t}^{i}(a^{i} | s^{i}) b_{t}^{i}(s^{i})$$

wherein the operator $P(s'^{i}|s^{i}, a^{i})=1\{s'^{i}=Tr^{i}(s^{i}, a^{i})\}$ is a binary indicator that only takes values 0 or 1, $1\{\bullet\}$ being an indicator function.

In the following step S306, the occupancy probability distribution $o_{t+1}^{i}(x^{i}, y^{i})$ for vehicle i at timestep t+1 is calculated on the basis of belief state $b^{i}_{t+1}$, according to the equation:

$$o^{i}_{t+1}(x^{i}, y^{i}) = \sum_{\dot{z}^{i},\ddot{z}^{i}} \sum_{s'^{i}=(x^{i},y^{i},\dot{z}^{i},\ddot{z}^{i})} b^{i}_{t+1}(s'^{i})$$

In the next step S307, it is checked whether road user index i has reached the total number of road users m in the traffic scene. If not, road user index i is incremented by one in step S308, before looping back to step S303, so as to calculate the belief states and occupancy probability distributions for time step t+1 for all road users in the traffic scene. On the other hand, if the road user index i has reached the number m, the next step will be step S309, in which it will be checked whether time index t has reached timestep T−1. If not, time index t will be incremented by one in step S310, before looping back to step S301, so as to calculate the belief states and occupancy probability distributions for timestep t+2 for all road users in the traffic scene. On the other hand, if time index t has reached timestep T−1, the belief states and occupancy probability distributions for all timesteps from t=1 to t=T will have been calculated and the prediction algorithm ends.

Figure 4A:
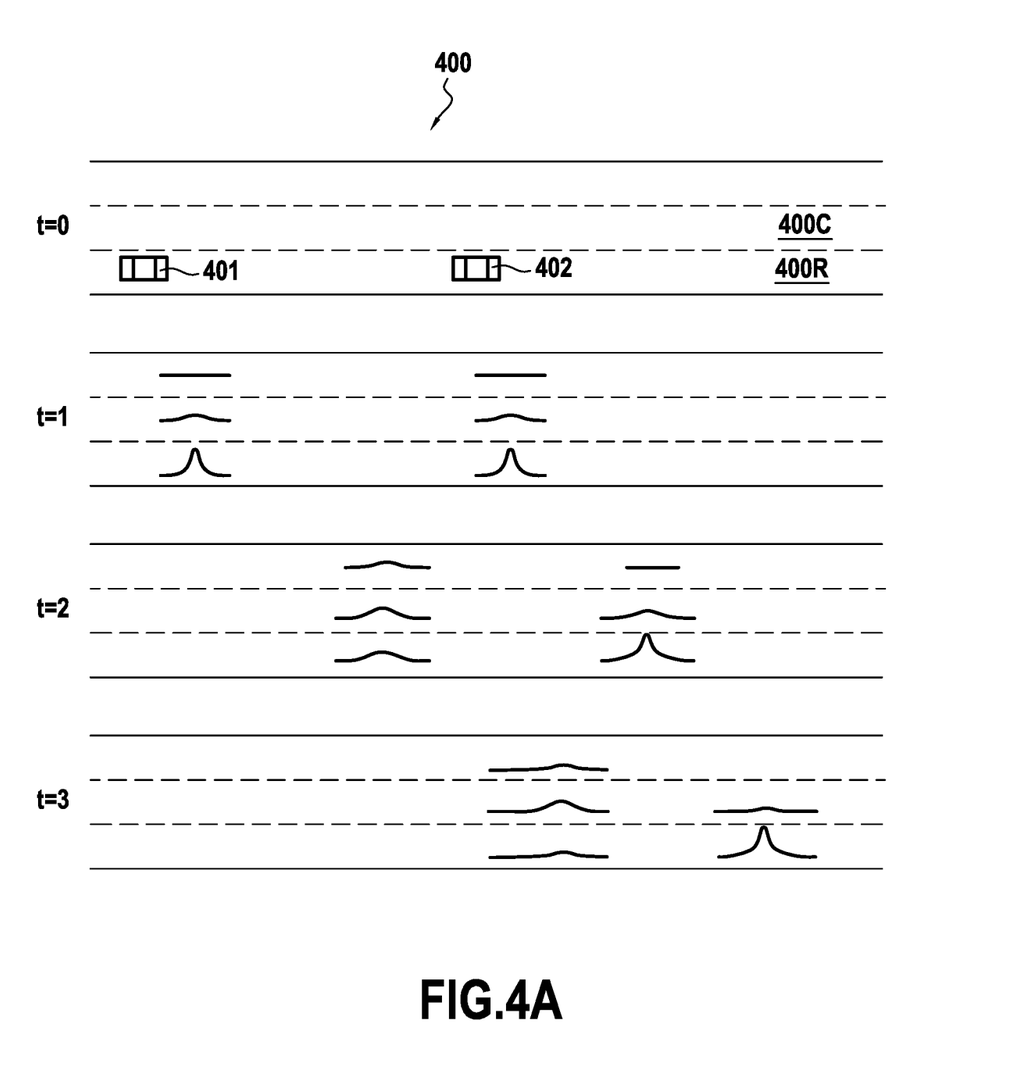
FIGS. 4A and 4B illustrate examples of traffic scene predictions within a driving assistance method according to an embodiment of the present invention.
Figure 4B:
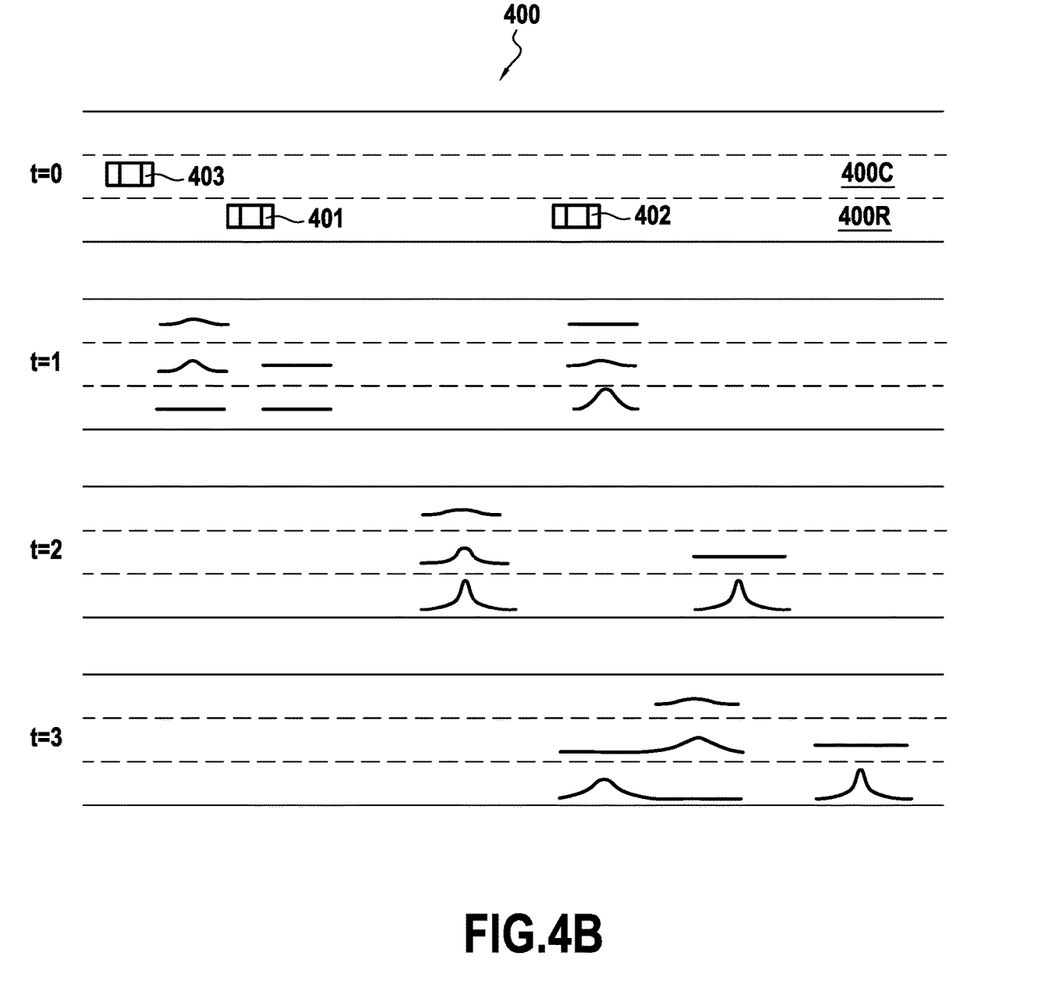

FIGS. 4A and 4B illustrate examples of the evolution of predicted occupancy probability distributions over three timesteps t=1, t=2 and t=3, using this prediction algorithm starting from different current traffic scenes at t=0, wherein the occupancy probability is illustrated on a vertical axis. In FIG. 4A, in the observed traffic scene at time t=0, a trailing road user 401 is approaching a leading road user 402 on the right-most lane 400R of a three-lane road 400. The algorithm predicts, as most likely evolution up to time t=3, a lane change of the trailing road user 401 to the center lane 400C to overtake the leading road user 402. In FIG. 4B, on the other hand, a third vehicle 403 already occupies the center lane 400C at time t=0, and as a result, the prediction algorithm, using the same behavioral models, predicts that trailing road user 401 will slow down to stay on the right-most lane 400R rather than accelerate or maintain its speed to overtake leading road user 402.

The time complexity of this algorithm grows linearly with respect to the time horizon T and with the number of available actions for each road user, and quadratically with respect to the number of road users and available states for each road user.

Finally, the data processor 103 also comprises a collision risk evaluation module 230 adapted to process the future traffic scene prediction output by scene prediction module 223 in order to determine a risk of collision for road vehicle 1 and, if this risk of collision exceeds a predetermined threshold, output a driver warning signal through warning signal output device 104 and/or execute an avoidance action through driving command output device 105.

Those skilled in the art will recognize that the present invention may be manifested in a variety of forms other than the specific embodiment described and contemplated herein. Accordingly, departure in form and detail may be made without departing from the scope of the present invention as described in the appended claims.

The invention claimed is:

1. A driving assistance method for a road vehicle, the driving assistance method comprising the steps of:
 detecting, within a traffic scene including the road vehicle, a set of road users and, for each road user of the set of road users, a current state including a current speed and a current position;
 assigning a dynamic behavioral model, from among a finite plurality of behavioral models, to each road user of the set of road users, wherein said dynamic behavioral model has at least one dynamic feature for taking into account a state of a road user other than the road user to which the dynamic behavioral model is assigned, the at least one dynamic feature of the dynamic behavioral model being applied to the road user to which the dynamic behavioral model is assigned;
 probabilistically estimating by a data processor, for each road user of the set of road users, a belief state for each time step of a plurality of successive subsequent time steps, each belief state comprising a set of alternative states and corresponding probabilities, each alternative state including a speed and a position, by using the dynamic behavioral model assigned to each road user of the set of road users, wherein a value of the at least one dynamic feature of said dynamic behavioral model is probability-weighted according to an occupancy probability distribution calculated on the basis of belief states of the set of road users for a preceding time step, to estimate a probability of an action from a set of alternative actions for each road user of the set of road users at the preceding time step, and then calculating each alternative state resulting from each action of the set of alternative subsequent actions for the corresponding road user;
 determining a risk of collision of the road vehicle with a road user of the set of road users, based on the probabilistically estimated belief state of each road user of the set of road users at a time step of the plurality of successive subsequent time steps; and
 outputting a driver warning signal and/or executing an avoidance action if the risk of collision exceeds a predetermined threshold.

2. The driving assistance method of claim 1, wherein the step of assigning a behavioral model, from among a finite plurality of behavioral models, to each road user of the set of road users is carried out, by a data processor, based on behavior by each road user of said set of road users prior to the current states.

3. The driving assistance method of claim 2, wherein, to assign to a road user a behavioral model from among the finite plurality of behavioral models, an aggregated probability of a prior trajectory of the road user, including successive prior states of the road user, is calculated using each behavioral model, and the behavioral model with the highest aggregated probability is selected.

4. The driving assistance method of claim 1, wherein each behavioral model of the finite plurality of behavioral models is associated with a cost function for calculating a cost of a subsequent action from a current state, and wherein the probability of an action from a set of alternative subsequent actions for a given road user is estimated as one minus the ratio of a cost of the action to the sum total of costs of the set of alternative subsequent actions, according to the cost function associated with a behavioral model assigned to the given road user.

5. The driving assistance method of claim 4, wherein the cost function comprises a dynamic cost component whose value is calculated by multiplying the probability-weighted value of the at least one dynamic feature by a corresponding component of a dynamic weight vector associated to a driving behavior.

6. The driving assistance method of claim 1, comprising a step of sorting the set of road users by order of decreasing driving priority, before the step of estimating a probability of each action from a set of alternative subsequent actions, which is successively carried out for each road user of the set of road users following the order of decreasing driving priority.

7. The driving assistance method of claim 1, wherein the at least one dynamic feature comprises a time-headway and/or a time-to-collision between the road user to which the dynamic behavioral model is assigned and another road user.

8. The driving assistance method of claim 1, wherein the dynamic behavioral model is a dynamic behavioral model learned from observed road user behavior using a machine learning algorithm.

9. The driving assistance method of claim 1, wherein the traffic scene comprises a multi-lane road, and the set of alternative subsequent actions for each road user of the set of road users comprises lane and/or speed changes.

10. A driving assistance system for a road vehicle, the driving assistance system comprising:
 a sensor set for detecting, within a traffic scene including the road vehicle, a set of road users and, for each road user of said set of road users, a current state including a current speed and a current position;
 a data storage device for a database comprising a finite plurality of behavioral models;
 a data processor, connected to the sensor set and to the data storage device, for:
 assigning a dynamic behavioral model, from among the finite plurality of behavioral models, to each road user of the set of road users, wherein said dynamic behavioral model has at least one dynamic feature for taking into account a state of a road user other than the road user to which the dynamic behavioral model is assigned, the at least one dynamic feature of the dynamic behavioral model being applied to the road user to which the dynamic behavioral model is assigned,
 probabilistically estimating, for each road user of the set of road users, a belief state for each time step of a plurality of successive subsequent time steps, said belief state comprising a set of alternative states and corresponding probabilities, each alternative state including a speed and a position, each belief state being probabilistically estimated by using the dynamic behavioral model assigned to each road user of the set of road users, wherein a value of the at least one dynamic feature of said dynamic behavioral model is probability-weighted according to an occupancy probability distribution calculated on the basis of belief states of the set of road users for a preceding time step, to estimate a probability of an action from a set of alternative actions for each road user of the set of road users at the preceding time step, and then calculating each alternative state resulting from each action of the set of alternative subsequent actions for the corresponding road user, and determining a risk of collision of the road vehicle with a road user of said set of road users, based on the probabilistically estimated belief state of each road user of the set of road users at a time step of the plurality of successive subsequent time steps; and an output device, connected to the data processor, for outputting a driver warning signal and/or executing an avoidance action if the risk of collision exceeds a predetermined threshold.

11. A road vehicle comprising a driving assistance system according to claim 10.

12. The driving assistance system of claim 10, wherein each behavioral model of the finite plurality of behavioral models is associated with a cost function for calculating a cost of a subsequent action from a current state, and wherein the cost function comprises a dynamic cost component whose value is calculated by multiplying the probability-weighted value of the at least one dynamic feature by a corresponding component of a dynamic weight vector associated to a driving behavior, and wherein the probability of an action from a set of alternative subsequent actions for a given road user is estimated as one minus the ratio of a cost of the action to the sum total of costs of the set of alternative subsequent actions, according to the cost function associated with a behavioral model assigned to the given road user.

* * * * *